United States Patent
Horii et al.

(10) Patent No.: US 9,146,587 B2
(45) Date of Patent: Sep. 29, 2015

(54) BROADCAST WAVE RECEIVER AND ELECTRONIC DEVICE

(75) Inventors: Yasuyuki Horii, Ome (JP); Atsuhiro Yanagida, Hamura (JP); Motoki Tomita, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 430 days.

(21) Appl. No.: 13/552,501

(22) Filed: Jul. 18, 2012

(65) Prior Publication Data

US 2013/0057783 A1    Mar. 7, 2013

(30) Foreign Application Priority Data

Sep. 1, 2011 (JP) ................................ 2011-190478

(51) Int. Cl.
*H04N 5/64* (2006.01)
*G06F 1/16* (2006.01)
*H04N 5/645* (2006.01)

(52) U.S. Cl.
CPC ............ *G06F 1/1637* (2013.01); *G06F 1/1601* (2013.01); *G06F 1/1681* (2013.01); *H04N 5/645* (2013.01)

(58) Field of Classification Search
CPC .......... H04N 5/64; H04N 5/645; H04N 5/655
USPC ........ 348/836–843; 349/58; 361/681, 679.01, 361/679.21, 679.02
See application file for complete search history.

(56) References Cited

U.S. PATENT DOCUMENTS

| | | | |
|---|---|---|---|
| 7,688,575 B2 | 3/2010 | Takayanagi et al. | |
| 2001/0036057 A1* | 11/2001 | Fukuyoshi | 361/681 |
| 2003/0160909 A1* | 8/2003 | Wang | 349/58 |
| 2006/0038933 A1* | 2/2006 | Hashimoto | 349/58 |
| 2008/0024970 A1* | 1/2008 | Lee | 361/683 |
| 2010/0177260 A1* | 7/2010 | Chang et al. | 349/58 |
| 2011/0221265 A1* | 9/2011 | Busack et al. | 303/152 |

FOREIGN PATENT DOCUMENTS

| | | |
|---|---|---|
| JP | 02-067679 A | 3/1990 |
| JP | 02-096776 A | 4/1990 |
| JP | 02-134584 U | 11/1990 |

(Continued)

OTHER PUBLICATIONS

First Office Action mailed by Japan Patent Office on Oct. 23, 2012 in the corresponding Japanese patent application No. 2011-190478—4 pages.

Explanation of Situation for Accelerated Examination issued by Japan Patent Office on Aug. 23, 2012 in the corresponding Japanese patent application No. 2011-190478—2 pages.

(Continued)

*Primary Examiner* — Michael Lee
(74) *Attorney, Agent, or Firm* — Knobbe, Martens, Olson & Bear LLP

(57) ABSTRACT

According to one embodiment, a television receiver comprises a cover covering the backside of a display module, and a frame-shaped mask provided on the periphery of the front surface of the display module. An antenna is provided along the periphery of the display module, and a cable electrically connected to the antenna is provided between the periphery of the display module and the inner surface of at least the cover or the mask. The cover or the mask includes a first claw and a second claw. If the cover (mask) includes the first claw and the second claw, the first claw is inserted into a recess defined in the mask (cover), while the second claw is engaged with the mask (cover).

7 Claims, 12 Drawing Sheets

(56) References Cited

FOREIGN PATENT DOCUMENTS

| JP | 03-045585 U | 4/1991 |
| JP | 2005-332111 A | 12/2005 |
| JP | 2008-152110 A | 7/2008 |

OTHER PUBLICATIONS

Concise Explanation of Relevance for JP 02-134584U, JP 03-045585U, JP 02-067679A & JP 02-096776A—2 pages.

* cited by examiner

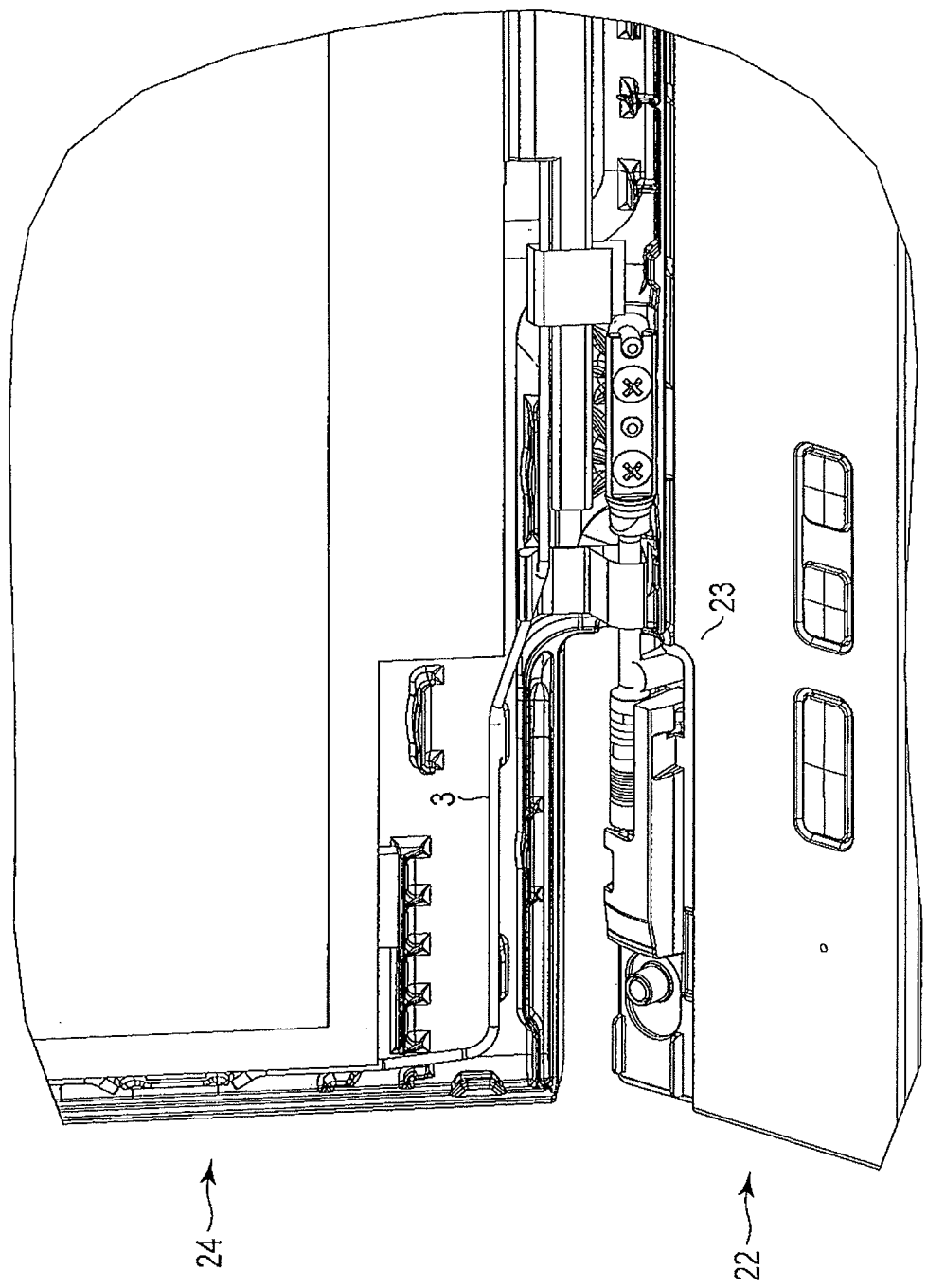

BROADCAST WAVE RECEIVER AND ELECTRONIC DEVICE

CROSS-REFERENCE TO RELATED APPLICATIONS

This application is based upon and claims the benefit of priority from prior Japanese Patent Application No. 2011-190478, filed Sep. 1, 2011, the entire contents of which are incorporated herein by reference.

FIELD

Embodiments described herein relate generally to a television receiver, a broadcast wave receiver and an electronic device which have a casing of a structure with no screws.

BACKGROUND

Conventional electronic devices such as television receivers, which employ, for good appearance, a fixing-means free structure having no screws exposed to the surface of the casing, are available. In this specification, the "fixing-means free structure" includes a structure free from adhesive agents, seal members, double-sided tape, etc., used to bond casing members.

However, the casings of this structure are not very satisfactory in structure or functionality. For instance, when the casing is assembled without screws, backlash may easily occur in the coupled portion of the casing.

Therefore, there is a demand for development of a television receiver, a broadcast wave receiver and an electronic device excellent in design and functionality.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 13 is a partially enlarged perspective view illustrating the portion located in the vicinity of one of the hinges shown in FIG. 5.

DETAILED DESCRIPTION

Various embodiments will be described hereinafter with reference to the accompanying drawings.

In general, according to one embodiment, a television receiver comprises a cover covering the backside of a display module, and a frame-shaped mask provided on the periphery of the front surface of the display module. An antenna is provided along the periphery of the display module, and a cable electrically connected to the antenna is provided between the periphery of the display module and the inner surface of at least the cover or the mask. The cover or the mask includes a first claw and a second claw. If the cover (mask) includes the first claw and the second claw, the first claw is inserted into a recess defined in the mask (cover), while the second claw is engaged with the mask (cover).

Figure 1:
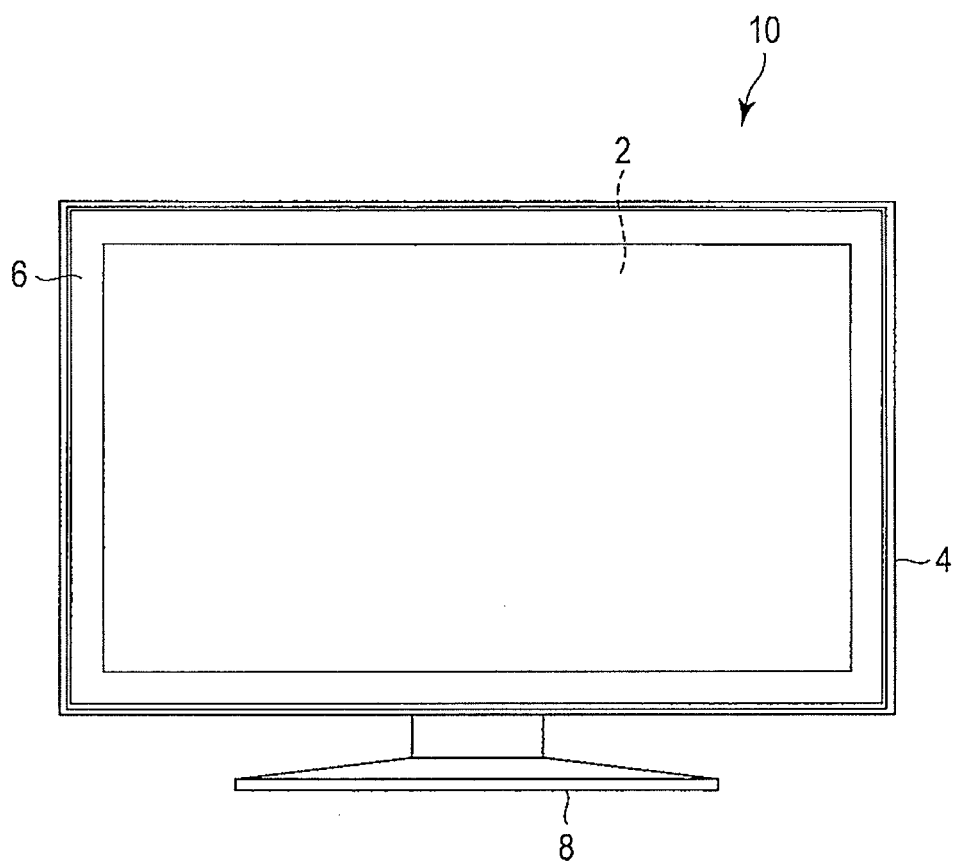
FIG. 1 is a front view of a television receiver according to a first embodiment.

FIG. 1 is a front view of a television receiver 10 (broadcast wave receiver) according to a first embodiment. As shown, the television receiver 10 comprises a display module 2 (internal module), such as a liquid crystal display (LCD), a backside cover 4 (first member) that covers the lateral sides and backside of the display module 2 (the "backside" means the side of the display module 2 opposite to the display surface thereof), and a rectangular mask 6 (second member). The television receiver 10 also comprises a stand assembly 8 secured to a chassis (not shown) that is provided between the display module 2 and the cover 4.

The display module 2 is formed flat and rectangular. The display module 2 receives a video signal from a video signal processing circuit (not shown) incorporated in a control circuit (not shown) that is formed of, for example, an electronic component mounted on a substrate, and displays video images, such as still images and motion images.

The control circuit of the television receiver 10 includes, as well as the video signal processing circuit, a tuner section, a high-definition multimedia interface (HDMI) signal processing section, an audio video (AV) input terminal, a remote controller signal receiving section, a control section, selector, an on-screen display interface, a storing section (e.g., a read only memory (ROM)), a random access memory (RAM), a hard disk drive (HDD), an audio signal processing circuit, etc., which are also not shown.

The television receiver 10 further comprises an amplifier (not shown), a speaker (not shown) for voice output, etc. The television receiver 10 also has an antenna (not shown) arranged along the periphery of the display module 2, and a cable 3 (see FIG. 3) that is located between the periphery of the display module 2 and the inner surface of at least the backside cover 4 or the mask 6 and is electrically connected to the antenna.

The backside cover 4 has a substantially rectangular peripheral wall 4a, at least part of which faces the periphery of the display module 2 (see FIG. 3), and a substantially rectangular flat bottom 4b that covers the backside of the display module 2. In the first embodiment, the peripheral wall 4a continuously surrounds the whole periphery of the display module 2.

One end (upper end in FIGS. 2 and 3) of the peripheral wall 4a has a projection that extends toward the periphery of the display module 2 and defines a recess 4c therein. The recess 4c is substantially a slit. Further, a hook 4d for hooking part of the mask 6 extends substantially vertically from the bottom 4b in the vicinity of a corner of the backside cover 4. The tip of the hook 4d is slightly angled away from the above-mentioned end of the peripheral wall 4a.

Ideally, a plurality of recesses 4c similar to the above-mentioned one may be provided at regular intervals along the above-mentioned end of the peripheral wall 4a, and a plurality of hooks 4d may project from the bottom 4b along the peripheral wall 4a. Further, the hook(s) 4d is not limited to the shown shape, but may have various shapes in accordance with the engagement structure on the mask 6 side, described later.

Figure 2:
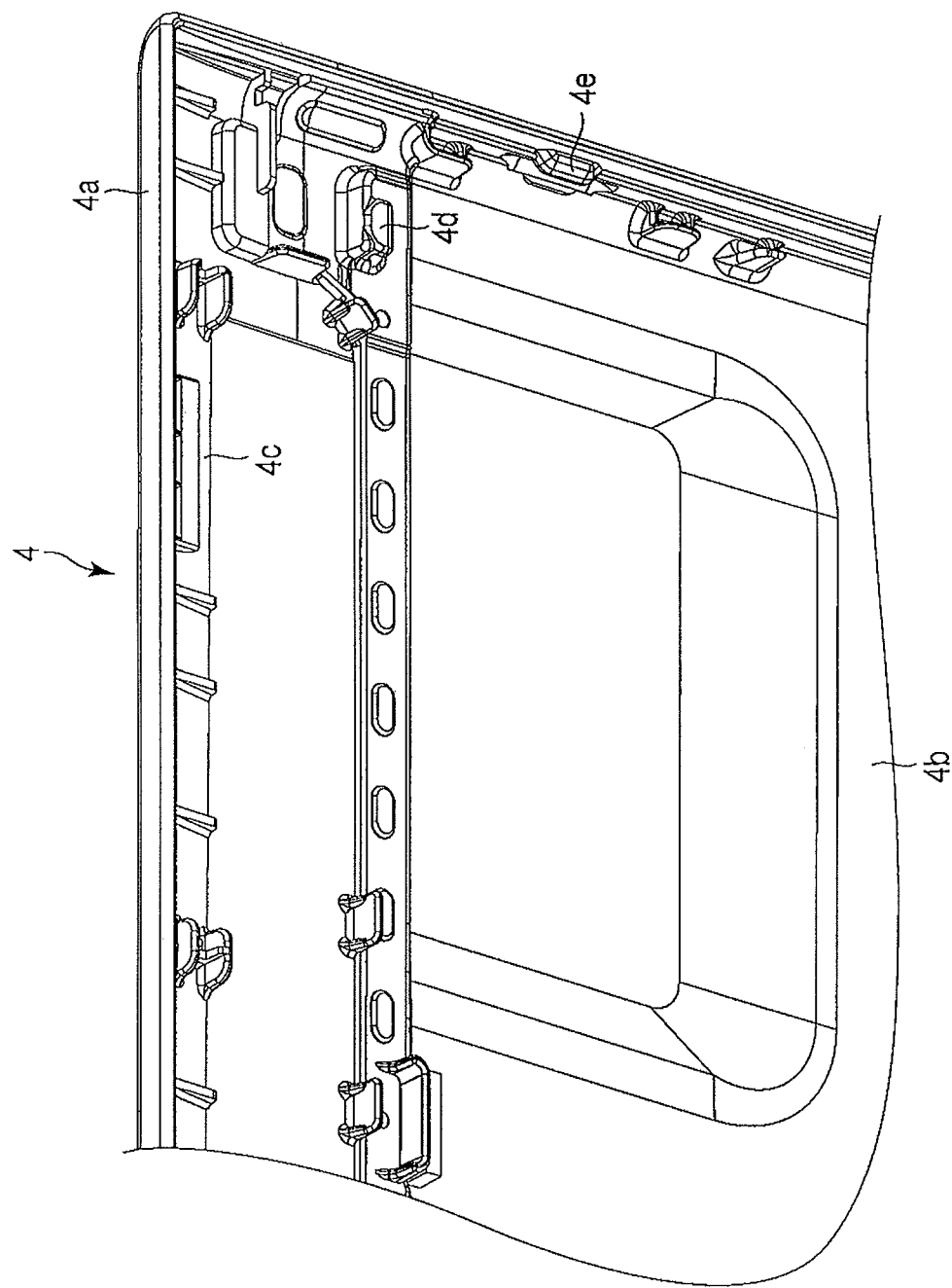
FIG. 2 is a partially enlarged perspective view illustrating the part of the television receiver of FIG. 1 inside the backside cover thereof.
Figure 3:
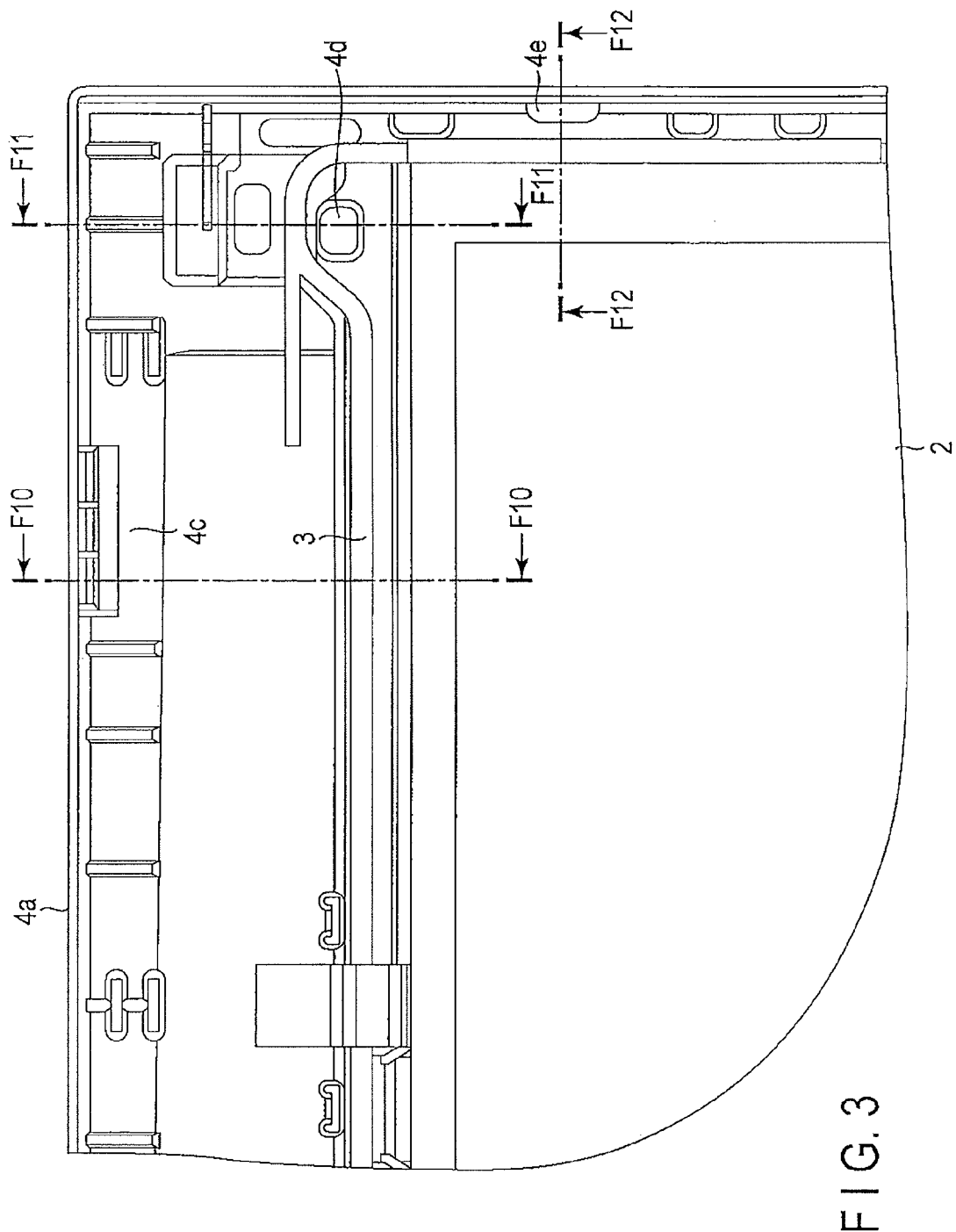
FIG. 3 is a partially enlarged plan view of the backside cover of FIG. 2, seen from inside.
Figure 4:
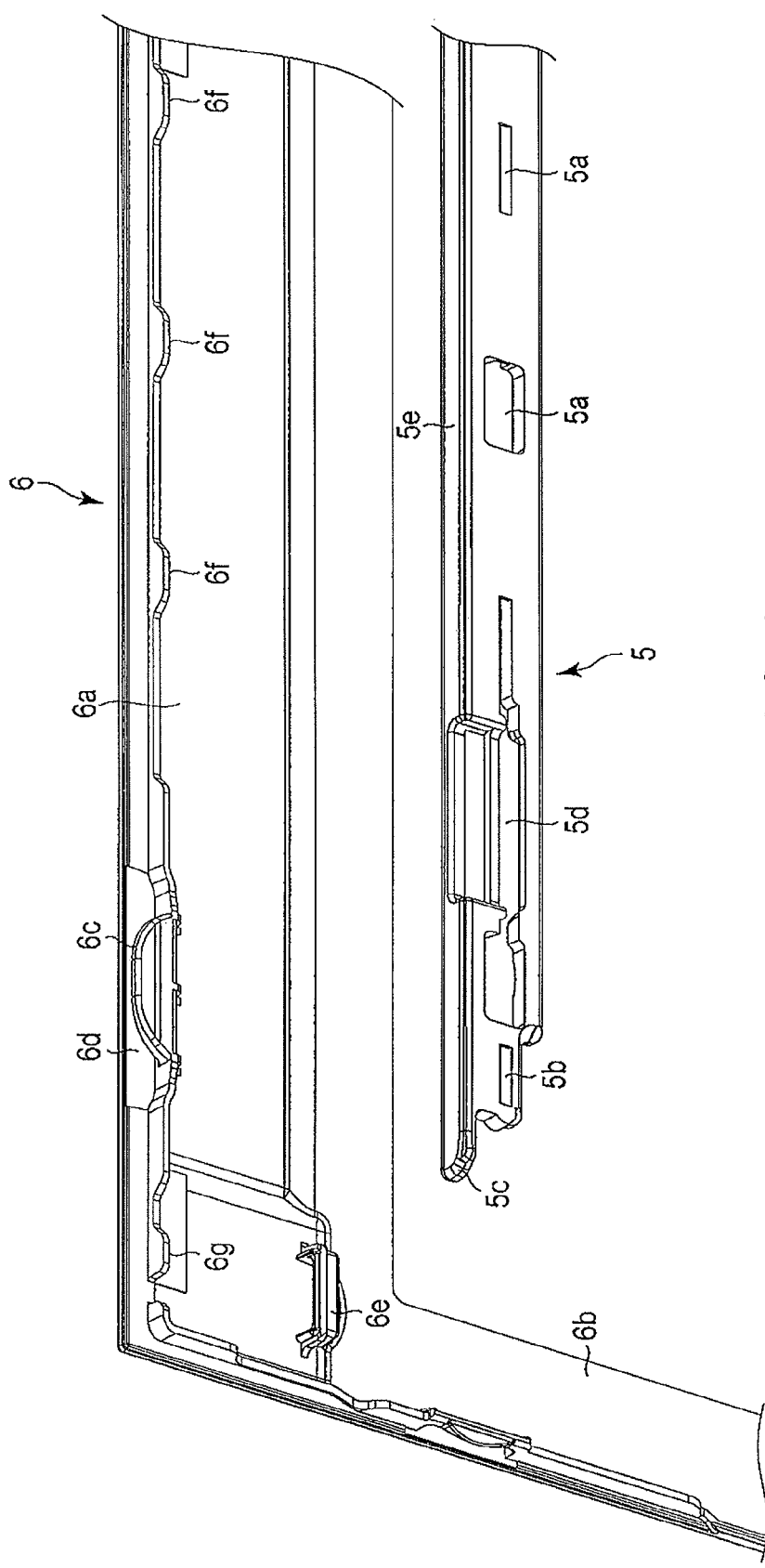
FIG. 4 is a partially enlarged perspective view illustrating the inside of the mask of the television receiver shown in FIG. 1, along with a buffer member.

FIG. 4 is an enlarged view illustrating part of the mask 6 (the part overlapping with the backside cover 4 in FIGS. 2 and 3). As shown, the mask 6 has a side portion 6a located within the above-mentioned end of the peripheral wall 4a of the backside cover 4, and another lateral side portion 6b angled by substantially 90 degrees with respect to the side portion 6a and extending therefrom continuously. As shown in FIG. 1, the mask 6 has a substantially rectangular shape and covers the entire periphery of the display module 2 on the opposite side of the bottom 4b of the backside cover 4. The mask 6 is fitted inside the peripheral wall 4a of the backside cover 4.

The upper side portion 6a of the mask 6 includes an insertion claw 6c (first claw or first projection) outwardly projecting and to be inserted in the recess 4c of the above-mentioned end of the peripheral wall 4a of the backside cover 4. A plurality of insertion claws 6c may be provided when a plurality of recesses 4c are provided at the backside cover 4. The insertion claw 6c is bent toward the inner surface of the above-mentioned end of the peripheral wall 4a of the backside cover 4, and has its distal end rounded. By thus rounding the distal end of the insertion claw 6c, the insertion projection can easily be inserted into the recess 4c of the backside cover 4.

In other words, the insertion claw 6c defines a recess 6d in which the projection of the peripheral wall 4a of the backside cover 4 with the recess 4c formed therein is inserted. Namely, by inserting the insertion claw 6c in the recess 4c of the backside cover 4, the projection defining the recess 4c is inserted in the recess 6d defined in the insertion claw 6c. The shape of the insertion claw 6c is not limited to the above, but may be modified in various ways in accordance with the shape of the recess of the backside cover 4. It is sufficient if the insertion claw 6c projects toward the peripheral wall 4a of the backside cover 4.

When the insertion claw 6c is inserted into the recess 4c, the mask 6 is moved relative to the backside cover 4, e.g., moved along the surface of the display module 2. In the first embodiment, the mask 6 is moved upward in FIG. 4. By thus inserting the insertion claw 6c into the recess 4c, the mask 6 is attached to the backside cover 4, with the side portion 6a (i.e., the upper portion in FIG. 4) of the mask 6 aligned with the above-mentioned end of the peripheral wall 4a of the backside cover 4.

Further, an engagement claw 6e (second claw) to be engaged with the hook 4d projecting from the bottom 4b of the backside cover 4 projects from the inner surface of the mask 6 opposed to the display module 2 or the backside cover 4. A plurality of engagement claws 6e may be provided when a plurality of hooks 4d are provided on the backside cover 4. The shape of the engagement claw 6e may be modified in various ways in accordance with the shape of the engagement portion (hook) of the backside cover 4. For instance, it may be a claw of a very simple shape.

When the mask 6 and the backside cover 4 are moved closer to each other, the engagement claw 6e is hooked by the hook 4d. Namely, the engagement claw 6e and the hook 4d are elastically latched. In this structure, it is not necessary to perform positioning of the engagement claw 6e and the hook 4d after the insertion claw 6c is inserted into the recess 4c, which facilitates the assembly work. The engagement structure between the engagement claw 6e and the hook 4d is not limited to the above, and may be modified in various ways.

Although in the first embodiment, the insertion claw 6c of the mask 6 is inserted into the recess 4c of the backside cover 4 and the hook 4d of the backside cover 4 is engaged with the engagement claw 6e of the mask 6, this structure may be modified such that the insertion and/or engagement claw 6c and/or 6e may be provided on the backside cover 4 side, and the recess and/or hook 4c and/or 4d may be provided on the mask 6 side.

Furthermore, a slim buffer member 5 (third member) of an L-shaped cross section is provided between the above-mentioned end of the peripheral wall 4a and the corresponding side portion 6a of the mask 6. The buffer member 5 is formed of a material lower in rigidity than the backside cover 4 or the mask 6. For instance, the buffer member 5 is formed of resin or rubber lower in rigidity than the backside cover 4 or the mask 6.

The buffer member 5 has attachment holes 5a and 5b for receiving projections 6f and 6g projecting from the inner surface of the side portion 6a of the mask 6. More specifically, in the first embodiment, a plurality of attachment holes 5a and a plurality of attachment holes 5b corresponding to a plurality of projections 6f and 6g provided on the side portion 6a of the mask 6 are formed in the buffer member 5. Thus, in the first embodiment, the buffer member 5 is attached to the mask 6 by receiving the projections 6f and 6g of the mask 6 in the attachment holes 5a and 5b.

The attachment holes 5b (only one of which is shown in FIG. 4) are formed in longitudinally opposite end portions of the buffer member 5 to receive the projections 6g provided on the longitudinally opposite end portions of the side portion 6a of the mask 6. The buffer member 5 also has end portions 5c extending outwardly further than the attachment holes 5b. The buffer member 5 is formed slightly shorter than the entire side portion 6a of the mask 6, and is attached to the inner surface of the mask 6 in a state in which the projections 6g are hooked in the attachment holes 5b with the two end portions 5c slightly pulled in opposite directions, namely, in which the buffer member 5 is slightly extended.

The buffer member 5 further includes a through hole 5d through which the insertion claw 6c projecting from the inner surface of the mask 6. Since the insertion claw 6c externally projects from the side portion 6a of the mask 6, the buffer member 5 attached to the side portion 6a needs to have the through hole 5d to avoid the insertion claw 6c.

The buffer member 5 further includes a projection 5e slightly projecting from the outer surface of the mask 6 toward the major surface of the television receiver 10 when the buffer member is attached to the end portion of the mask 6. The projection 5e continuously extends along the entire length of the side portion 6a of the mask 6 between the outer edge of the side portion 6a and the one end of the peripheral wall 4a of the backside cover 4, when the television receiver 10 is viewed from the front. This enhances the appearance of the television receiver 10.

In particular, since the projection 5e of the buffer member 5 includes the end portions 5c extending to the respective ends of the mask 6, the appearance of the television receiver 10 when viewed from the front is better enhanced. However, since the outermost projection 6g for attaching the buffer member 5 to the mask 6 cannot be provided at the absolute edge of the mask 6. Accordingly, to provide the projection 5e along the entire length of the side portion 6a of the mask 6, the projection 5c that further outwardly projects from the outermost attachment hole 5b is necessary.

As described above, the first embodiment employs a fixing-means free structure that does not require any fixing member, such as a screw, when the mask 6 is attached to the backside cover 4. This structure can reduce the number of required components, therefore facilitate the assemblage of the television receiver 10, and reduce the assemblage cost. The fixing-means free structure prevents, for example, the heads of screws from exposing on the front surface of the television receiver, thereby enhancing the appearance. Also, the fixing-means free structure enables disassembly of the television receiver 10 using no tool, which makes it much easier to recycle the receiver.

Further, since the fixing-means free structure does not have to consider allowances for screws, it enables the television receiver 10 to be made thinner. In addition, the buffer member 5 provided between an end portion of the backside cover 4 and an end portion of the mask 6 eliminates a loose state of the backside cover 4 and the mask 6.

Figure 5:
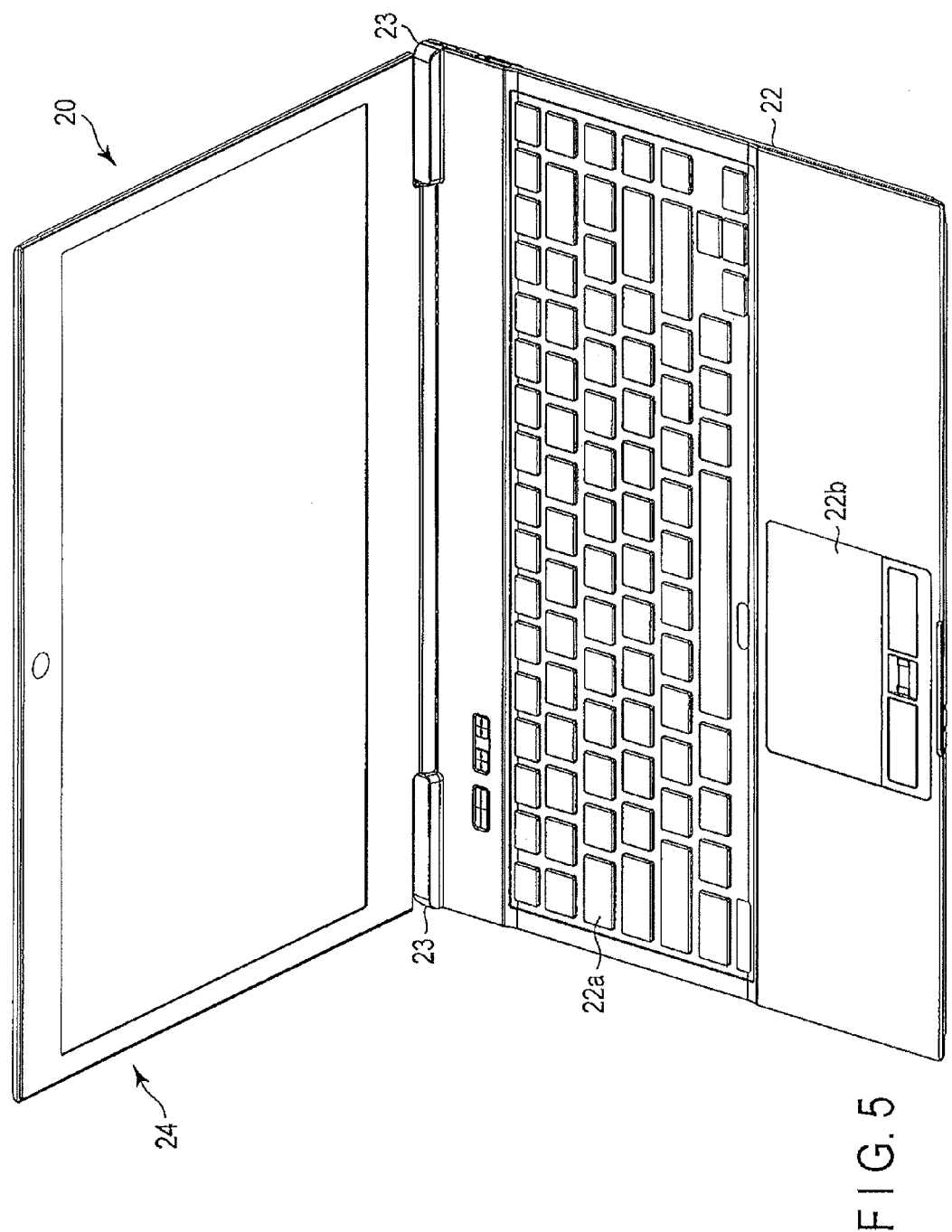
FIG. 5 is a perspective view illustrating a note PC according to a second embodiment.

Referring then to FIG. 5, a notebook-size personal computer (hereinafter, simply a "note PC") 20 as an electronic device example according to a second embodiment will be described. FIG. 5 is a perspective view illustrating the appearance of the note PC 20. In FIG. 5, the display panel 24 (second main unit) of the note PC 20 is open with respect to the main unit 22 (first main unit) of the PC. Thus, the display panel 24 is rotatably attached to the rear end of the main unit 22 via two hinges 23 (connecting portions).

In the description below, elements similar to those of the first embodiment are denoted by corresponding reference numbers, and their detailed descriptions may be omitted. For instance, the essential part of the display panel 24 has substantially the same structure as the combination of the display module 2, the backside cover 4 and the mask 6 of the television receiver 10 of the first embodiment.

As shown in FIG. 5, a keyboard 22a and a touch pad 22b are provided on the upper surface of the main unit 22, which is to be covered with the display panel 24 when the PC is closed. On the other hand, the display screen of the display module 2 is exposed as part of the display panel 24. Namely, when the display screen of the display panel 24 is placed on the upper surface of the main unit 22 (this state is not shown), it is closely opposed to the keyboard 22a and the touch pad 22b in a non-contact manner. The display screen of the display module 2 is exposed to the outside within the display panel 24. Namely, when the display screen of the display panel 24 is placed on the upper surface of the main unit 22 (this state is not shown), the display screen closely opposes the keyboard 22a and the touch pad 22b, kept out of contact with them.

Figure 6:
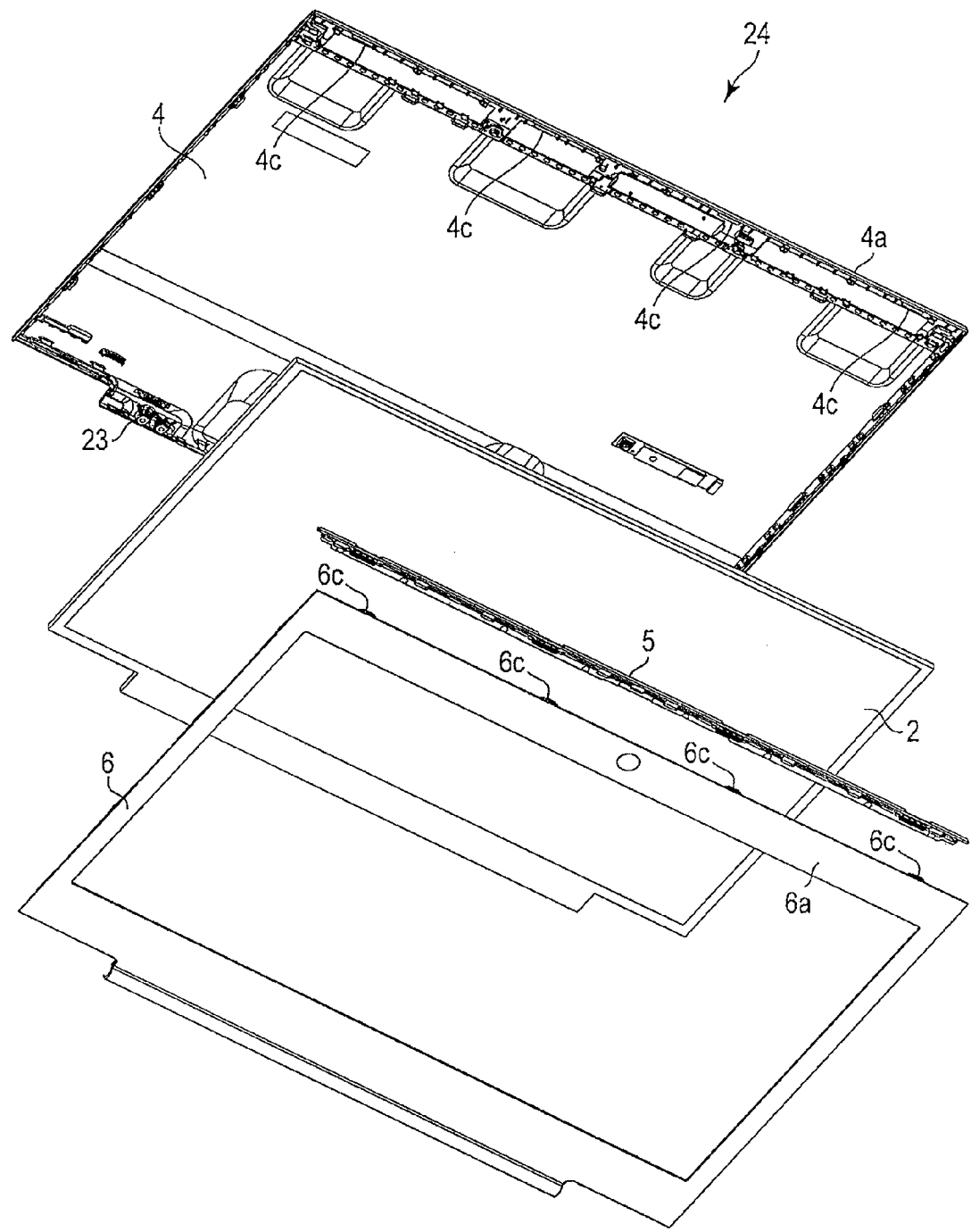
FIG. 6 is an exploded perspective view of the display panel shown in FIG. 5, seen from the front.
Figure 7:
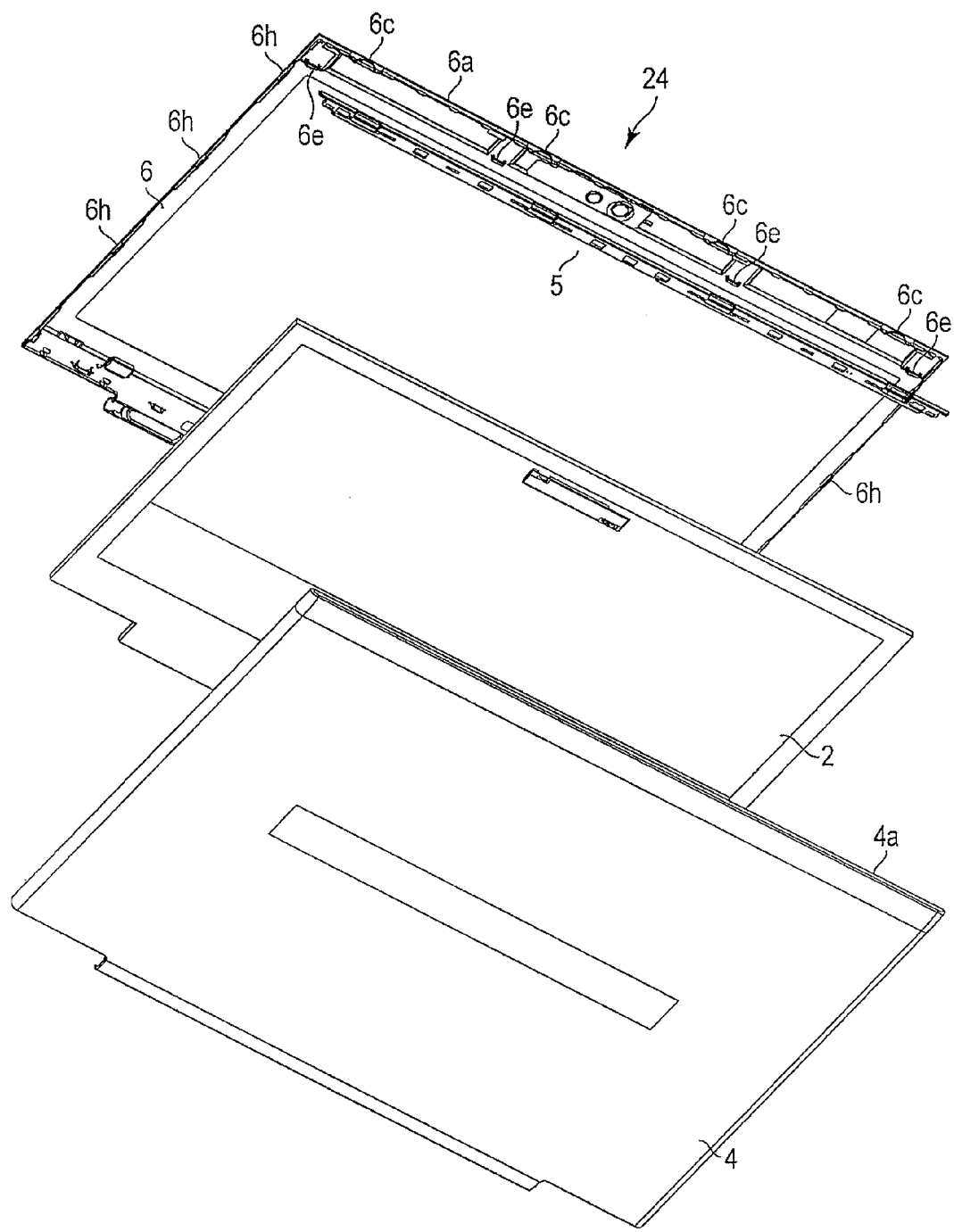
FIG. 7 is an exploded perspective view of the display panel shown in FIG. 5, seen from behind.
Figure 8:
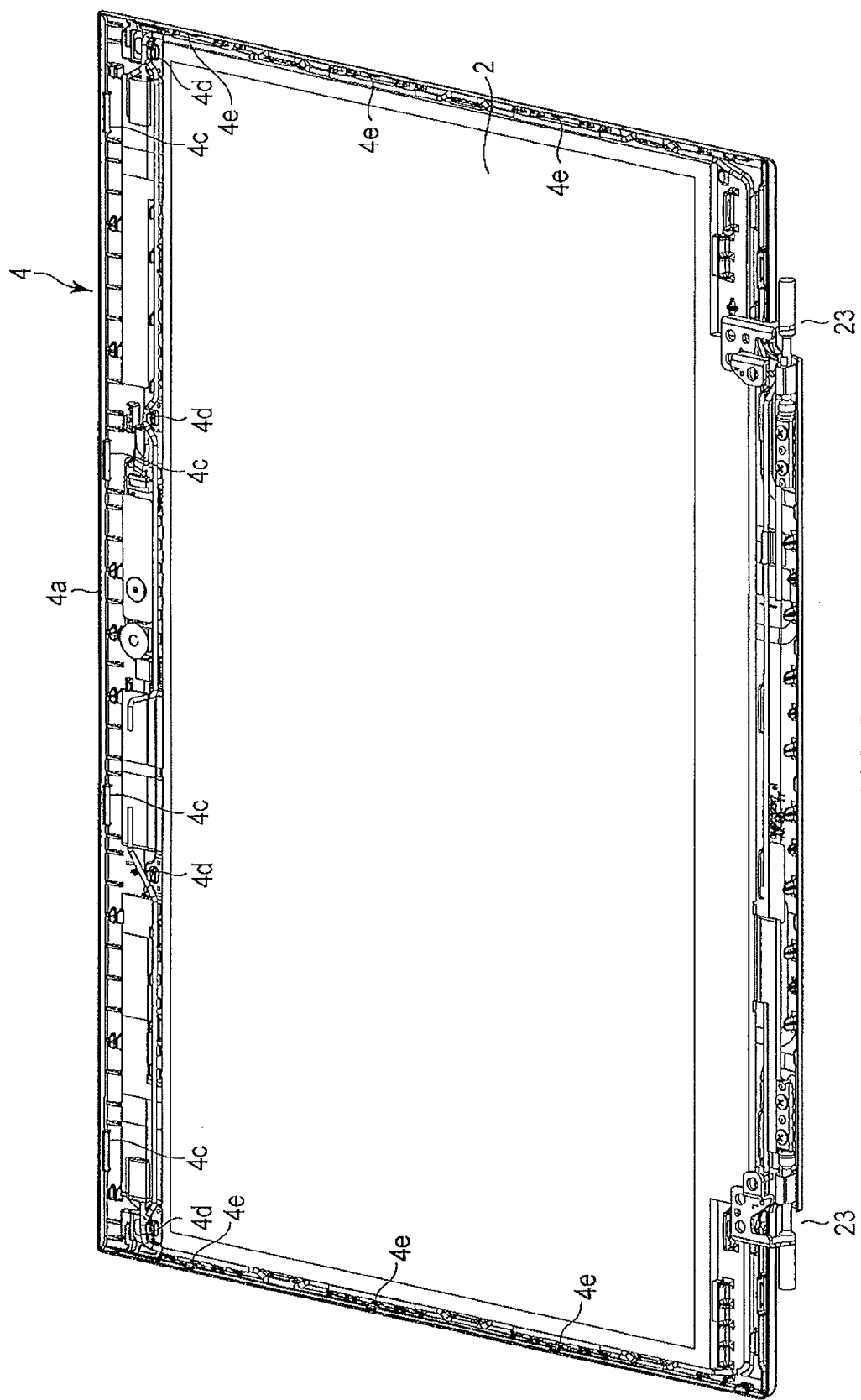
FIG. 8 is a perspective view illustrating a state in which a display module is arranged inside the backside cover of the display panel shown in FIG. 5.
Figure 9:
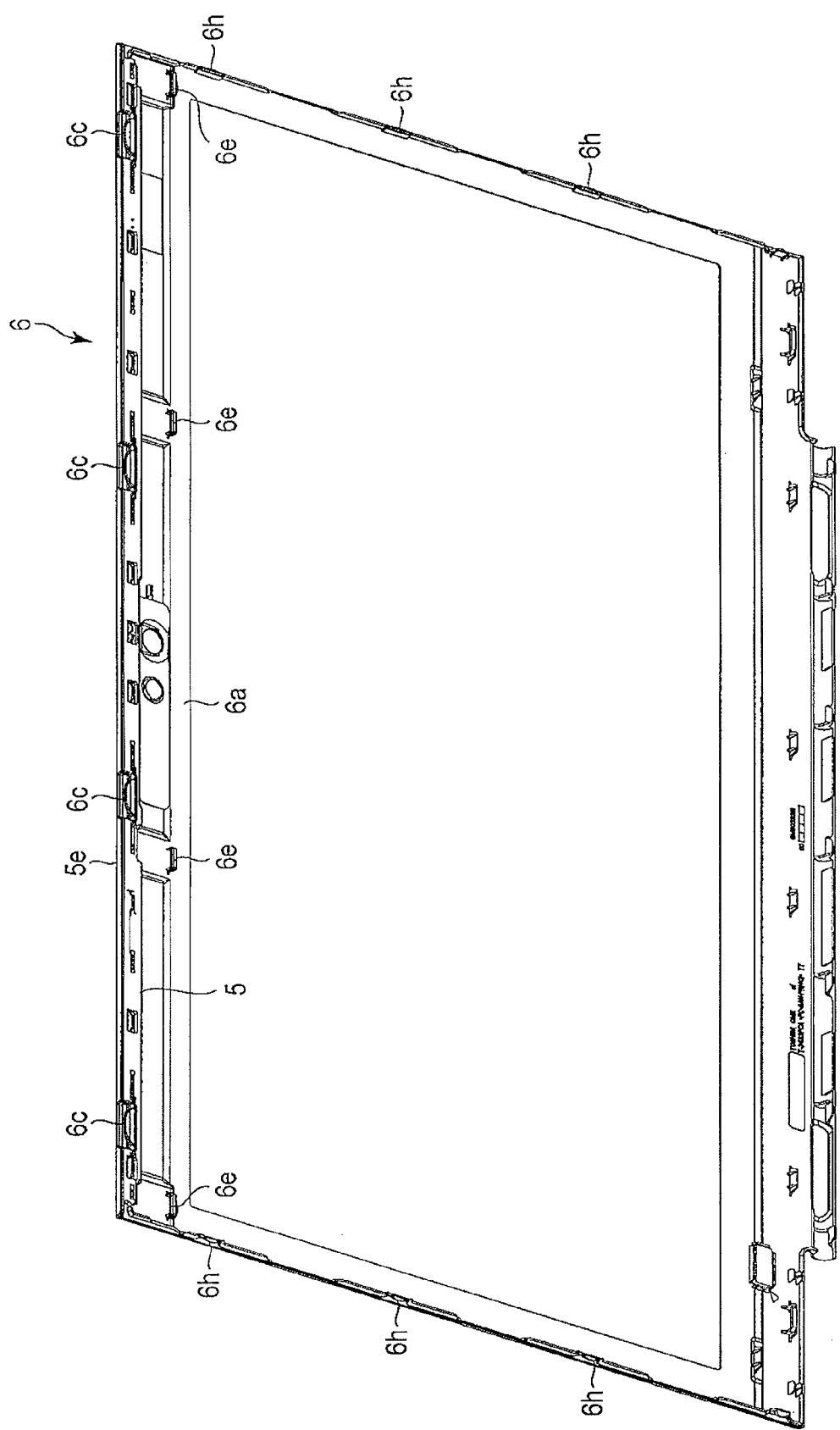
FIG. 9 is a perspective view of the mask of the display panel shown in FIG. 5, seen from inside.

FIG. 6 is an exploded perspective view of the display panel 24, seen from the front, and FIG. 7 is an exploded perspective view of the display panel 24, seen from behind. FIG. 8 is a perspective view illustrating a state in which the display module 2 is arranged inside a backside cover 4, and FIG. 9 is a perspective view of a mask 6, seen from behind. As mentioned above, since the essential part of the backside cover 4 and the mask 6 are substantially the same as that of the television receiver 10 of the first embodiment, their detailed descriptions may be omitted.

The display panel 24 includes the display module 2 (internal module, module), the backside cover 4 (first member) provided behind the display module 2, the mask 6 (second member) provided in front of the display module 2, and a buffer member 5 (third member) interposed between one end (in the second embodiment, the front end away from the hinges 23) of the peripheral wall 4a of the backside cover 4 and the side portion 6a of the mask 6.

A plurality (four in the second embodiment) of recesses 4c are provided at substantially regular intervals along the length of the front end of the peripheral wall 4a of the backside cover 4 located away from the hinges 23. Further, a plurality (three in the second embodiment) of engagement projections 4e (see FIGS. 2 and 3) project on each of the inner surfaces of the lateral portions of the peripheral wall 4a of the backside cover 4. Similarly, a plurality (four in the second embodiment) of hooks 4d are provided on the portion of the bottom 4b of the backside cover 4 close to the front end of the peripheral wall 4a.

On the front side portion 6a of the mask 6, a plurality (four in the second embodiment) of insertion claws 6c (first claws) corresponding to the recesses 4c of the backside cover 4 project. On each of the lateral side portions 6b of the mask 6, a plurality (three in the second embodiment) of engagement claws 6h (second claws) corresponding to the engagement projections 4e of the backside cover 4 outwardly project. Further, on the inner surface of the front side portion 6a of the mask 6 located away from the hinges 23, a plurality (four in the second embodiment) of insertion claws 6e (third claws) corresponding to the hooks 4d of the backside cover 4 project.

The engagement projections 4e of the backside cover 4 and the engagement claws 6h of the mask 6 are not limited to the above-mentioned structures, but may be modified in various ways. It is sufficient if they can be engaged with each other.

Figure 10:
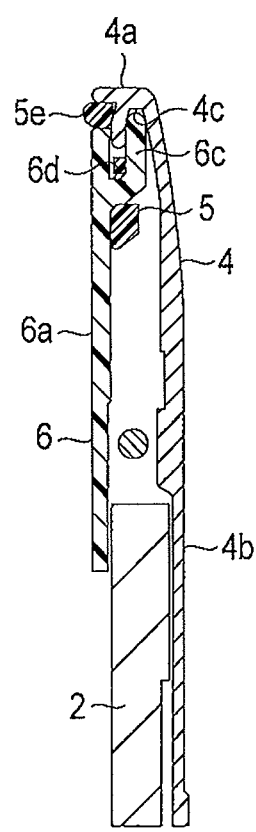
FIG. 10 is a sectional view taken along line F10-F10 of FIG. 3.
Figure 11:
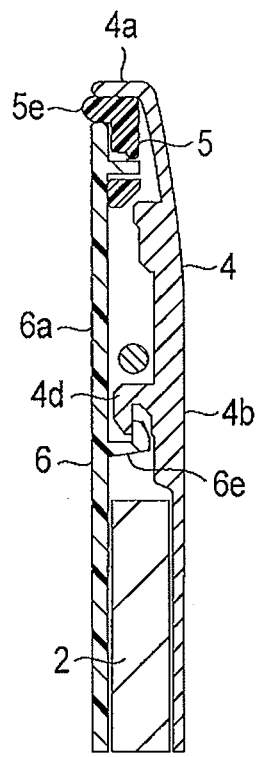
FIG. 11 is a sectional view taken along line F11-F11 of FIG. 3.
Figure 12:
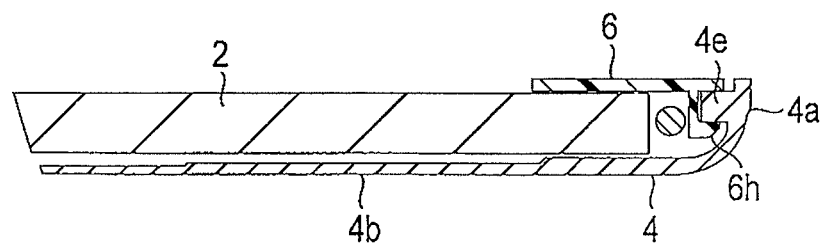
FIG. 12 is a sectional view taken along line F12-F12 of FIG. 3.

Referring mainly to FIGS. 10 to 12, a method of assembling the display panel 24 will be described. FIG. 10 is a sectional view taken along line F10-F10 of FIG. 3, FIG. 11 is a sectional view taken along line F11-F11 of FIG. 3, and FIG. 12 is a sectional view taken along line F12-F12 of FIG. 3. In the description below, the structure of FIG. 3 will be regarded as that of the display panel 24 of the note PC according to the second embodiment. Further, although FIG. 3 shows only the structure of the backside cover 4, FIGS. 10 to 12 show all components of the display panel 24.

Firstly, the buffer member 5 is attached to the inner surface of the side portion 6a of the mask 23 located away from the hinges 23. To this end, the four insertion claws 6c of the mask 6 are inserted into the through holes 5d of the buffer member 5, and the projections 6f and 6g of the mask 6 are engaged with the attachment holes 5a and 5b of the buffer member 5. At this time, the opposite ends 5c of the buffer member 5 are pulled to engage the outermost attachment holes 5b with the outermost projections 6g of the mask 6. The engaged state is shown in FIG. 9.

On the other hand, the display module 2 is received within the backside cover 4 as shown in FIG. 8. At this time, an antenna(s) and a camera module are arranged between the upper end (shown in FIG. 10, for example) of the display module 2 and the peripheral wall 4a of the backside cover 4. The cable connecting these electronic components is routed to avoid, for example, the hooks 4d projecting from the bottom 4b of the backside cover 4.

After that, the mask 6 is attached to the backside cover 4 to hold the display module 2 therebetween by covering the periphery of the display module 2 with the mask 6. At this time, the buffer member 5 attached to the mask 6 overlaps the antenna received in the backside cover 4. In the second embodiment, the mask 6 is attached to the backside cover 4 with no screws.

When attaching the mask to the backside cover, firstly, the side portion 6a of the mask 6 located away from the hinges 23 is positioned inside the peripheral wall 4a of the backside cover 4 away from the hinges 23, then the mask 6 is moved toward the inner surface of the peripheral wall 4a along the display screen of the display module 2, and the insertion claws 6c projecting from the side portion 6a are inserted into the recesses 4c of the backside cover 4. FIG. 10 is a cross sectional view illustrating a state in which the insertion claws 6c of the mask 6 are fitted in the recesses 4c of the backside cover 4. In this state, the projection 5d of the buffer member 5 held between the mask 6 and the backside cover 4 projects from the front surface of the mask 6.

Subsequently, the mask 6 is pressed toward the bottom 4b of the backside cover 4, thereby engaging the engagement claws 6e of the mask 6 with the hooks 4d projecting from the bottom 4b of the backside cover 4. At this time, the insertion claws 6c of the mask 6 are already fitted in the recesses 4c of the backside cover 4 to align the mask 6 with the backside cover 4, and therefore, it is not necessary to position the engagement claws 6e with respect to the hooks 4d. FIG. 11 is a cross sectional view illustrating an engaged state in which the engagement claws 6e of the mask 6 are engaged with the hooks 4d of the backside cover 4.

Thereafter, the engagement claws 6h projecting from the lateral side portions 6b of the mask 6 are engaged with the engagement projections 4e projecting the peripheral wall 4a of the backside cover 4, thereby attaching the two lateral side portions 6b to the backside cover 4. FIG. 12 is a cross sectional view illustrating an engaged state in which the engagement claws 6h of the mask 6 are engaged with the engagement projections 4e of the backside cover 4.

As described above, by attaching the mask 6 to the backside cover 4, the display module 2 is fixed between the mask 6 and the backside cover 4. Since in the second embodiment, fastening members, such as screws, are not used to fix the mask and the backside cover, the stress that occurs in the peripheral portion of the display module 2 can be dispersed, thereby preventing damage of the fixed portion due to stress concentration.

Further, since the hinges 23 of the note PC 20 of the second embodiment have no metal plates extending in the display panel 24, as is shown in FIG. 13, the cable 3 connected to the antenna and the camera module can be easily routed. Further, since there are no metal plates extending in the display panel 24, the mask 6 is elastically deformable in the vicinity of the hinges 23, which facilitates attachment and detachment of the mask 6 to and from the backside cover 4.

As described above, in the embodiments, the mask 6 and the backside cover 4 are fixed without using fastening members, such as screws, and hence the appearance of the device is enhanced. For instance, since no screws are used, the device is free from exposure of screw heads on the surface of the mask 6, and therefore exhibits an enhanced appearance.

Instead, in the embodiments, the projection 5e of the buffer member 5 is exposed on the front surface side of the display panel 24. However, the projection 5e continuously extends along the entire length of the side portion 6a of the mask 6, it does not degrade the appearance of the device. The projection 5e is designed to a height which enables the display screen of the panel and the keyboard to be kept out of contact with each other when the display panel 24 is closed to cover the upper surface of the main unit 22.

The fixing-means free structure of the embodiments enables the display panel 24 to be formed thin, which contributes to thinning of the note PC 20. Namely, if the mask 6 is fastened to the backside cover 4 using screwed, it is necessary to set, to a certain height, the bosses provided on the inner surface of the backside cover 4 for receiving the screws, in order to secure the engagement amounts of the screws. For this purpose, the thickness of the backside cover 4 must be increased.

Furthermore, if the fixing structure using screws is employed, it is necessary to provide an elastic protection member on the head of each screw exposed on the surface of the mask 6, which also increases the thickness of the display panel 24. Namely, it is necessary to provide protection members that protect, for example, the keyboard from being put into contact with and damaged by the heads of the screws, when the display panel 24 is closed on the main unit 22.

In contrast, in the embodiments, since part of the buffer member 5 forms the projection 5e that projects and is exposed on the front surface side of the display panel 24, a necessary minimum clearance can be secured between the display panel 24 and the main unit 22 without thickening the note PC 20. Further, since the projection 5e of each embodiment is provided along the end of the display panel 24 located away from the hinges 23, it does not oppose the touch pad, which will not involve a problem that the pad is unintentionally pressed during carrying the note PC 20.

The fixing-means free structure of the embodiments facilitates decomposition of the display panel 24 and hence facilitates recycling of the same. Furthermore, the fixing-means free structure using no screws enables the number of the components required for the display panel 24 to be reduced, and hence the assembling cost of the display panel 24 to be minimized.

In at least one of the above-described television receiver and electronic device, the casing can be assembled with no fastening members, such as screws, which enhances the appearance and functionality of the device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For instance, although in the above-described embodiments, the buffer member 5 and the backside cover 4 are separate members to be attached to each other, the invention is not limited to this, but may be modified such that the buffer member 5 and the backside cover 4 may be formed integral as one body. In this case, it is not necessary to position them relative to each other, and therefore the accuracy of dimensions can be enhanced.

Yet further, although in the above-described embodiments, the television receiver 10 and the note PC 20 have been described, the invention is also applicable to another type of electronic device, such as a tablet with no keyboard.

What is claimed is:

1. A broadcast wave receiver comprising:
an internal module;
a first member on one side of the internal module;
a second member on another side of the internal module; and
a third member having a first rigidity, wherein the first rigidity is lower than a rigidity of the first and second members, and wherein the third member is between an end of the first member and an end of the second member, wherein the second member comprises a first projection and a second projection, the first projection configured to be inserted into a recess in the first member when the second member is moved along a surface of the internal module, the second projection configured to be engaged with the first member when the second member is moved toward the first member, wherein the third member comprises a third projection projecting toward said another side by a further distance than the second member.

2. The broadcast wave receiver of claim 1, wherein the third projection extends along an entire length of the end of the second member.

3. A broadcast wave receiver comprising:
an internal module;
a first member on one side of the internal module;
a second member on another side of the internal module; and
a third member having a first rigidity, wherein the first rigidity is lower than a rigidity of the first and second members, and wherein the third member is between an end of the first member and an end of the second member,
wherein the second member comprises a first projection and a second projection, the first projection configured to be inserted into a recess in the first member when the second member is moved along a surface of the internal module, the second projection configured to be engaged with the first member when the second member is moved toward the first member, wherein the third member comprises a through hole through which the first projection of the second member can be inserted.

4. An electronic device comprising first main unit, and a second main unit coupled to the first main unit such that the first and second main units are configured to be openable and closable relative to each other, wherein one of the first and second main units comprises:
an internal module;
a first member on a backside of the internal module;
a second member on a front side of the internal module; and
a third member between an end of the first member and an end of the second member,
wherein the second member comprises a first claw and a second claw, the first claw configured to be inserted into a recess in the first member when the second member is moved along the front side of the internal module, the second claw configured to be engaged with the first member when the second member is moved toward the first member, wherein the third member comprises a projection projecting further forwardly than the second member.

5. The apparatus of claim 4, wherein the projection extends along an entire length of the end of the second member.

6. The apparatus of claim 5, wherein the projection has a height which enables the first and second main units to be kept out of contact with each other when the first and second main units are in a closed state.

7. The apparatus of claim 6, wherein the third member is on an end of the one of the first and second main units, the end of the one of the first and second main units located away from a connection between the first and second main units.

* * * * *